Patented Dec. 26, 1933

1,940,988

UNITED STATES PATENT OFFICE 1,940,988

PROCESS FOR THE PREPARATION OF ORGANIC ACIDS

Alfred T. Larson, Wilmington, Del., assignor, by mesne assignments, to E. I. du Pont de Nemours & Company, Wilmington, Del., a corporation of Delaware No Drawing. Application February 28, 1931
Serial No. 519,277

14 Claims. (Cl. 260—116)

This invention relates to the synthesis of organic acids, by catalysis from gaseous mixtures of carbon monoxide and an alcohol.

It is known that organic acids such as acetic acid, propionic acid, and other aliphatic organic acids may be produced by the catalytic reaction of carbon monoxide and an alcohol having one less carbon atom than is desired in the acid to be produced. The alcohol-carbon monoxide reactions may be broadly expressed as follows:

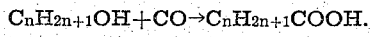

$$C_nH_{2n+1}OH + CO \rightarrow C_nH_{2n+1}COOH.$$

In accordance with the particular operating conditions, it is known that, in some instances, the acid may not be formed directly in the free state, but may be produced as an ester by condensation of the acid formed with the particular alcohol used in the process, as indicated below:

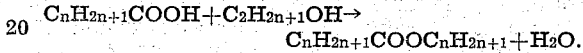

$$C_nH_{2n+1}COOH + C_2H_{2n+1}OH \rightarrow$$
$$C_nH_{2n+1}COOC_nH_{2n+1} + H_2O.$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more separate alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

In the practical manufacture of organic acids by the above methods considerable difficulty is encountered due to the exothermic nature of the reactions which, of course, are also reversible. It is desirable that the products of the reaction should be of a certain and uniform composition, that the minimum amount of alcohol be employed and (for these reasons) that the equilibrium, or maximum conversion, be attained.

In reactions of this type involving the condensation of an alcohol with carbon monoxide it is realized, upon a theoretical consideration of the reaction, that numerous products should be formed in conjunction with the desired organic acid, and from an experimental investigation of the reaction it has been found that such products are formed, under certain conditions. As the formation of these side products decreases the efficiency of the process, efforts have been made to suppress them and there is good reason to believe that when effecting the reaction, with a definite catalyst under a given pressure, there is a critical temperature range mentioned above, often very narrow, within which the maximum yield of the acid will be attained with a minimum formation of by-products. It is, therefore, advantageous to conduct the reaction for the synthesis of organic acid under such conditions that the temperature be held within this critical range.

Operating against the above considerations is the exothermic nature of these reactions. It is apparent that the heat, evolved by the condensation of an alcohol with carbon monoxide, is a function of the alcohol that reacts, and the temperature of the reaction zone is determined by the heat and the thermal capacity of the gases in contact with the catalyst. To compensate for, and control this temperature rise, resort may be had to known methods such, for instance, as providing exterior or interior means for cooling the conversion chamber, cooling the raw gases, or employing cool raw gases admixed with inerts having a high heat capacity. Such expedients are not, however, entirely suitable, as by their use, a uniform temperature, throughout the catalyst bed is difficult, if not impossible, of approximating by simple means.

With a view to eliminating these and other difficulties in the practical synthesis of organic acids, it is the object of the present invention to provide an improved process for the synthesis of these acids by catalysis from mixtures of carbon monoxide and an alcohol.

Other objects and advantages of the invention will be apparent as it is better understood by reference to the following specification in which its details and preferred embodiments are described.

I have found that the operating difficulties hereinbefore referred to may, to a large extent, be avoided by proceeding in accordance with the following method. All, or substantially all, of the carbon monoxide that is to be employed is mixed with a fraction of the necessary, preferably vaporized, alcohol or compound which is known to decompose to form the alcohol, such as the dialkyl ethers, alkyl esters, etc. This gaseous mixture is subjected to the reaction under elevated temperature and pressure in contact with a suitable, hot catalyst. The products of the reaction may then be cooled, preferably to a temperature corresponding approximately to that at which the gases were first admitted to the catalyst; although this intermediate cooling is not essential, it is of advantage in some instances. To the cooled gas an additional portion of the alcohol or other compound used is then added and the mixture is subjected to further reaction in the presence of a catalyst. The additional cooling referred to is preferably accomplished largely by the introduction of the additional portion of the alcohol, perhaps preheated just enough to produce the desired temperature in the resulting mixture.

The number of stages in which the fractional additions of the alcohol are made, as well as the amount added in each stage may be varied through wide limits, depending on the particular organic acid being prepared and the catalyst used. Thus a gaseous mixture entering the first stage may contain all of the necessary carbon monoxide and inert gases used plus, say, approximately 20% of the necessary alcohol,—30% of the alcohol being added between the first and second stages and the remaining 50% of the alcohol between the second and third stages.

An additional important advantage of the process relates to the thermal problems hereinbefore referred to. Whereas the methods of operation ordinarily employed tend to heat parts of the catalyst bed to a temperature other than that preferred for the reaction and thereby lower the yield of the useful product,—my process enables one to hold constant the whole catalyst bed at substantially the optimum temperature, thereby insuring efficient operation.

Although the invention is susceptible of variation as to the details of procedure employed, the following example will illustrate a specific embodiment of the process the details of which will not in any way restrict the scope of the invention.

A gaseous mixture containing 77% carbon monoxide, 7.6% water, and 15.4% methanol is passed over a charcoal catalyst promoted with monocalcium phosphate, at a temperature of 350° C. and a pressure of 700 atmospheres. The catalyst is prepared by intimately mixing 85 parts of comminuted charcoal with 15 parts of comminuted monocalcium phosphate. The resulting mixture may be pilled to the desired form or otherwise compressed and granulated. The gases issuing from the catalyst are treated (e. g. by condensation) for the removal of the acetic acid formed and after adding to the unconverted gases 27% by volume of methanol they are passed over a catalyst similar to the above, the products from this step are again treated for the removal of the acid, and prior to the final conversion 35% by volume of methanol is added. By so conducting the reaction the temperature can be readily held at 350° C. and an excellent yield of the acetic acid realized.

The condensation step between conversions, while not essential to the operation of my invention, has the advantage that the amount of methyl acetate formation, caused by the interreaction of acetic acid formed during the first and second steps of the reaction with the methanol in the second and third steps, is inhibited. Should the desired product be methyl acetate, it would, of course, be advisable to dispense with the condensation between the stages.

Not only can methanol be catalyzed in the presence of carbon monoxide, according to my invention, to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

The apparatus, which may be employed for conducting these reactions, may be of any conventional type and preferably one in which the temperature of the exothermic reaction can be readily controlled at the optimum value. If a single converter is used, inlets for the alcohol may be disposed along its sides for the introduction thereof at various depths in the catalyst bed. When using a plurality of converters the fractional additions of the alcohol may be made prior to the first and between the subsequent converters. Owing to the corrosive action of acetic acid, the interior of the converter or converters and apparatus leading therefrom should preferably be protected. This may be accomplished by using glass or glass-lined apparatus or by plating the inner surfaces thereof with chromium or silver or using for the construction of this equipment acid resisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are conducted by the fractional addition of the alcohol to the reaction.

I claim:

1. The process of synthesizing organic acids which comprises subjecting carbon monoxide together with a portion of the alcohol with which it is ultimately to react to the action of a heated catalyst, adding alcohol to the resulting mixture, and subjecting it without additional carbon monoxide to further reaction in contact with a heated catalyst.

2. The process of synthesizing organic acids which comprises subjecting carbon monoxide together with a portion of the alcohol with which it is ultimately to react to the action of a heated catalyst, and thereafter subjecting the resulting gaseous mixture without additional carbon monoxide to one or more additional reaction stages in which a further portion of alcohol is added thereto, and the mixture is subjected again to the reaction in contact with a heated catalyst.

3. The process of synthesizing organic acids which comprises subjecting carbon monoxide together with a portion of the alcohol with which it is ultimately to react to the action of a heated catalyst, and thereafter subjecting the resulting gaseous mixture without additional carbon monoxide to one or more additional reaction stages prior to each of which the gaseous mixture is cooled, another portion of alcohol is added thereto, and thereafter the resulting mixture is subjected to the reaction in contact with a heated catalyst.

4. The process of synthesizing organic acids which comprises subjecting carbon monoxide together with a portion of the alcohol with which it is ultimately to react to the action of a heated catalyst, separating the organic acid therefrom, adding further alcohol thereto, and subjecting the resulting mixture without additional carbon monoxide to further reaction in contact with a heated catalyst.

5. The process of synthesizing organic acids which comprises subjecting carbon monoxide together with a portion of the alcohol with which it is ultimately to react to the action of a heated catalyst, and thereafter subjecting the resulting gaseous mixture without additional carbon monoxide to one or more additional reaction stages in which a further portion of an alcohol is added and thereafter separating the organic acid therefrom, and subjecting the resulting mixture to the reaction in contact with a heated catalyst.

6. The process of synthesizing acetic acid which comprises subjecting carbon monoxide together with a portion of the methanol with which it is ultimately to react, to the action of a heated catalyst, adding a further portion of methanol thereto, and subjecting the resulting mixture without additional carbon monoxide to further reaction in contact with a heated catalyst.

7. The process of synthesizing acetic acid which comprises subjecting carbon monoxide together with a portion of the methanol with which it is ultimately to react, to the action of a heated catalyst, and thereafter subjecting the resulting gaseous mixture to one or more additional reaction stages in which the gaseous mixture is cooled, by the addition of methanol, and thereafter the resulting mixture is subjected to reaction in contact with a heated catalyst.

8. The process of synthesizing acetic acid which comprises subjecting carbon monoxide together with a portion of the methanol with which it is ultimately to react, to the action of a heated catalyst, cooling the resulting gaseous mixture, and removing therefrom the acetic acid, adding methanol to the gaseous mixture subsequent to the removal of the acetic acid, and subjecting the resulting gaseous mixture without additional carbon monoxide to further reaction in contact with a heated catalyst.

9. In a process for the synthesis of organic acids the steps which comprise subjecting substantially all of the carbon monoxide that is to be employed together with but a portion of the alcohol with which the carbon monoxide is ultimately to react to the action of a heated catalyst, adding a further portion of the alcohol to the resulting mixture, and subjecting it to further reaction in contact with a heated catalyst.

10. In a process for the synthesis of acetic acid the steps which comprise subjecting substantially all of the carbon monoxide that is to be employed together with but a portion of the methanol with which the carbon monoxide is ultimately to react, to the action of a heated catalyst, adding a further portion of the methanol to the resulting mixture, and subjecting it to further reaction in contact with a heated catalyst.

11. In a process for the synthesis of organic acids the steps which comprise subjecting substantially all of the carbon monoxide that is to be employed together with but a portion of the alcohol with which the carbon monoxide is ultimately to react to the action of a heated catalyst, cooling the resulting gaseous mixture and removing therefrom the organic acid, adding a further portion of the alcohol to the resulting mixture, and subjecting it to further reaction in contact with a heated catalyst.

12. In a process for the synthesis of acetic acid the steps which comprise subjecting substantially all of the carbon monoxide that is to be employed together with but a portion of the methanol with which the carbon monoxide is ultimately to react, to the action of a heated catalyst, condensing from the resulting mixture the acetic acid formed, and after adding to the unconverted gases additional methanol contacting them with a heated catalyst.

13. In a process for the synthesis of organic acids by the interaction of carbon monoxide and an alcohol in the presence of a catalyst the steps which comprise conducting the synthesis in a plurality of catalytic reaction stages, substantially all of the carbon monoxide being added prior to the first stage and the alcohol being introduced prior to the first stage and between the subsequent stages.

14. In a process for the synthesis of acetic acid by the interaction of carbon monoxide and methanol in the presence of a catalyst the steps which comprise conducting the synthesis in a plurality of catalytic reaction stages, substantially all of the carbon monoxide being added prior to the first stage and the methanol being introduced prior to the first stage and between the subsequent stages.

ALFRED T. LARSON.